Figure 1:
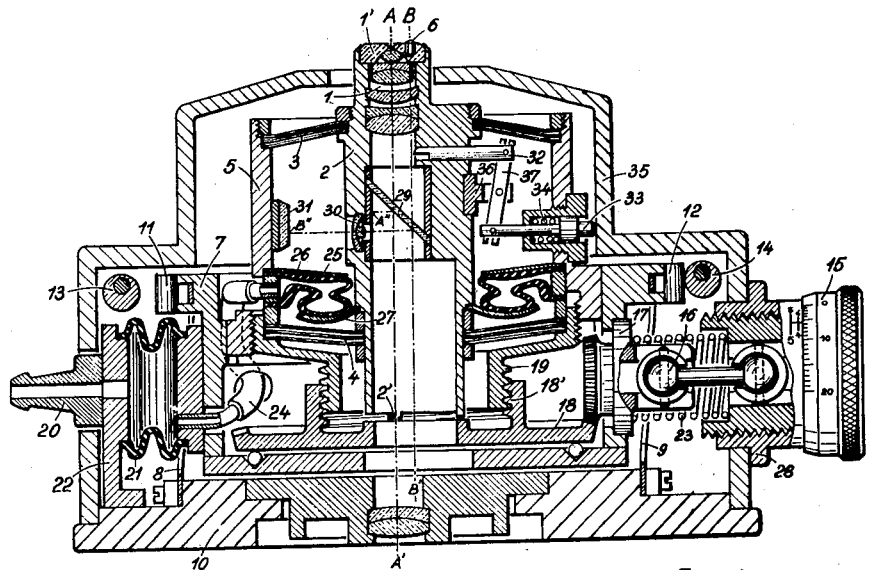

Aug. 20, 1957     E. BERNHARDT     2,803,130

MICRO HARDNESS TESTER

Filed March 29, 1954

United States Patent Office 2,803,130
Patented Aug. 20, 1957

2,803,130

MICRO HARDNESS TESTER

Eugen Bernhardt, Heidenheim (Brenz), Wurttemberg, Germany, assignor to Carl Zeiss, Heidenheim (Brenz), Wurttemberg, Germany Application March 29, 1954, Serial No. 419,559

2 Claims. (Cl. 73—81)

Micro hardness testers for determining the hardness of small structural constituents of materials by microscopically measuring the size of impression on said constituent can be divided into two groups according to whether the production of the test load on the penetration body results from spring pressure or from a weight load. Object of the invention are improvements in micro hardness testers especially with spring load. To be sure the invention is not restricted to this kind of construction, but is fundamentally applicable also to a construction with weight load.

Micro hardness testers with spring load are characterized by high sensitivity in the production and measurement of small test loads. Therefore they are advantageously applied in the actual metallographic function of micro hardness testing, namely to undertake hardness determinations of smallest structural constituents with very small test loads and evaluation of smallest impressions with highly magnifying microscope optics. The known micro hardness testers of spring load construction usually possess a pyramid-shaped penetration body of diamond (Vickers pyramid), which is either mounted in a separate mount and interchanged with the objective, or united with the objective in a common mount, whereby the pyramid is arranged beside the free aperture of the front lens. Further an arangement is known, in which the penetration body is mounted on the front lens surface and the pyramid point, located in the optical axis, leaves an annular zone of the front lens free. With these hardness testers the penetration body or the objective mount carrying the penetration body is so suspended in springs that the penetration body is guided in a direction parallel to the optical axis of the microscope. The test load is produced thereby that the hardness tester and the test piece fastened on the microscope stage are approached to one another by means of the fine or coarse adjustment of the microscope. Since the flexure of the springs taking place hereby is a measure for the acting test load, an optical indication of the spring displacement can in known manner be used for measuring the test load.

Arrangements of the described kind however possess the following defects: Firstly, the certainty of aim of the hardness tester and the faultlessness of the impression formation is dependent to a high degree upon the quality of the microscope movements. It is very difficult to keep the microscope movements sufficiently free from lost motion, and, over the entire stretch of the spring displacement, parallel to the parallel guidance of the penetration body. Secondly a high certainty of aim becomes then questionable, when the switching from observation of the test object to production of the impression is effected by manipulation of operating elements mounted directly on the hardness tester. The construction of customary metallurgical microscopes is usually not so rigid that the mutual position of microscope stage and micro hardness tester remains unalterable, if operating elements on the micro hardness tester or on the microscope are manipulated by hand. Thirdly production of the test load, resulting from manipulation of the fine or coarse adjustment of the microscope, requires a not inconsiderable expenditure of time and a high degree of attention. This in the series of measurements from numerous individual measurements customary in micro hardness testing results in a quick fatigue of the microscopist.

Object of the invention is a micro hardness tester which contains a microscope objective, a penetration body guided in direction of the microscope axis, and a spring or weight means for producing the test load, preferably of the construction with spring load, in which the described defects are avoided by a hydraulic or pneumatic driving means for moving the penetration body in direction of the microscope axis to and from the place at which penetration begins, which consists of an elastic hollow body in which a pressure agent performs the work of moving the penetration body in the direction of the microscope axis.

A further development of a micro hardness tester according to the invention in which the penetration body is arranged laterally beside the free aperture of the objective front lens is characterized by a supplementary driving means for alternately moving the penetration body and objective transverse to the microscope axis, which supplementary driving means consists of a further elastic hollow body in which a pressure agent performs the work for the alternating movement.

In accordance with an especially advantageous embodiment of this development of the invention said spring or weight means and said driving means are adjusted to effect a chronologically separated succession in moving the penetration body in the direction transverse to and in the microscope axis so that upon simultaneously releasing the driving agent from both said elastic hollow bodies the lateral movement of the penetration body and objective is substantially finished before the movement of the penetration body in the direction toward the test piece surface begins, and that upon simultaneously feeding the driving agent to both said bodies at first the movement of the penetration body away from said surface begins and is substantially finished before the lateral movement of the penetration body and objective transverse to the microscope axis begins.

In so far as such micro hardness testers, as is frequently the case, are equipped with a device for optical indication of the test load, it is advantageous according to a further development of the invention, to provide shutters, which in dependence on the two working positions of the micro hardness tester in turn set free only the image of the test object or of the load indicator scale.

Figure 2:
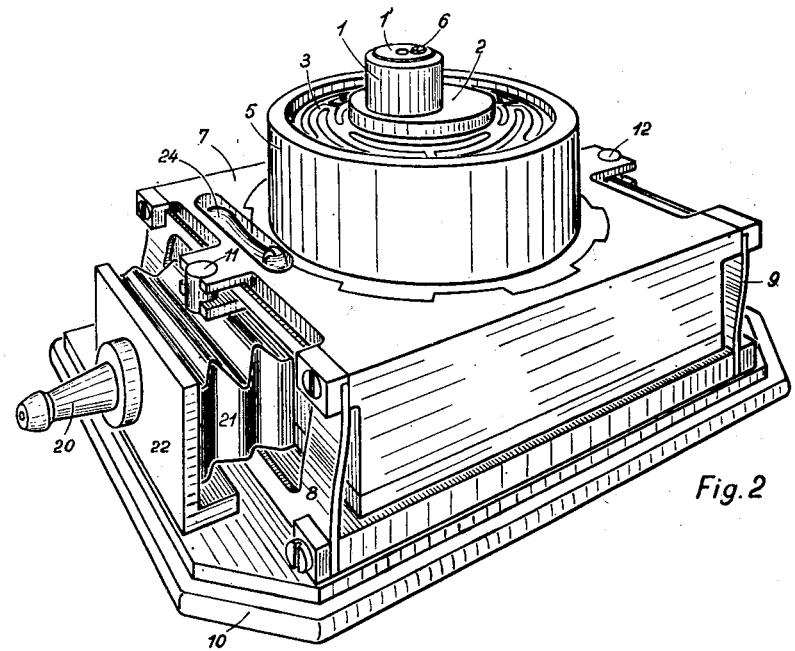

In the accompanying drawings Figures 1 and 2 represent an exemplary embodiment of an instrument according to the invention. Fig. 1 is a longitudinal section of the apparatus, through the optical axis, Fig. 2 a view after removal of the housing cap. An objective 1 is mounted in an inner tube 2 and suspended in an outer tube 5 in known manner by means of three upper designated by 3, and three lower cup springs designated by 4. The cup springs advantageously possess the form with segmental cut outs represented in Fig. 2 which impart to the springs a long elastic path. Besides this spring form possesses a certain transverse elasticity which effects an effective shearing compensation, in case for any reasons the direction of movement of the diamond should depart from the vertical to the test surface. A diamond 6 is fitted in familiar fashion as a constituent of the front lens 1' of the objective, however it is not located in the optical axis, but in a boring in the optically not utilized border zone of the front lens, outside its free aperture. The outer tube 5 possesses below a spline profile and is carried vertically in a correspondingly shaped guide of a horizontal slide 7. The horizontal slide can execute a horizontal movement in the lengthwise direction of the apparatus, so that alternatively the objective axis A—A' and the diamond axis B—B' arrive in the microscope axis. For this purpose the horizontal slide 7 is mounted in a spring parallelogram consisting of the two frame-shaped plate springs 8 and 9, which in turn are fastened to a bed plate 10 of the micro hardness tester. The horizontal movement, whose stroke must be exactly equal to the distance between objective and diamond axis, is limited thereby that two stops 11 and 12 alternatively touch eccentrics 13 and 14 coordinated with them. The eccentricity of the axis of eccentric serves for adjusting the final positions of the horizontal movement. If the inner tube 2 is for the first held in a lowest initial position through the means to be more fully described in the following, then the prestress of the cup springs 3 and 4 and therewith the magnitude of the desired test load can be adjusted through raising of the outer tube 5 along its spline profile. The pinion shown at the right of Fig. 1 serves this purpose. By operating a drum 15 provided with a load scale, a driver 17 which for its part engages a cone wheel 18 is actuated by way of a freely movable cardan shaft 16. A screw 18' of the cone wheel 18 runs on a spindle 19 which forms the lower closure of the outer tube 5. Consequently the outer tube 5 is raised or lowered with operation of the drum 15.

In the embodiment according to Figs. 1 and 2 a common hydraulic or pneumatic drive is provided for the horizontal alternating movement and for the vertical load movement. Thereby the pressure agent, which can be a liquid or a gas, however suitably is compressed air, is conveyed to a tube nipple 20 from where it arrives into a bellows 21, shaped like an accordion. The bellows 21, made of elastic material, suitably rubber, is mounted between a supporting angle piece 22 fastened to the base plate and the horizontal slide 7. When compressed air is admitted the bellows 21 expands and presses the horizontal slide 7 against the elastic force of a spring 23 towards the right. Thereby the stops 11 and 13 separate from one another and the stops 12 and 14 come into contact. The compressed air is in addition conducted across a tube line 24 to a folded membrane 25. This folded membrane is a hollow body of rotation closed on all sides, whose shape is indicated by the cross section 25. Through the arrangement of the cyclic folds this body when compressed air is admitted can be inflated in the axial direction without resistance worth mentioning, to collapse again into a flat structure upon pressure release. Upwards the folded membrane supports itself against a flat disk 26 fastened in the outer tube 5, downwards against a bowl support 27 attached to the inner tube 2. When compressed air is admitted the folded membrane 25 is inflated and drives the disk 25 and the bowl 27 apart. The result is that the inner tube 2 sinks down against the elastic force of the cup springs 3 and 4 until three feet 2' of the innter tube touch down on a ring-shaped track of the cone wheel 18. The cup springs 3 and 4 now have the prestress corresponding to the test load adjusted with the drum 15 of the pinion, and the inner tube 2 has the initial position required for producing the load. The objective is now in the observation position and the diamond out of action. This position, in which both driving organs of the pneumatic drive are under pressure, is shown in Fig. 1.

Then the procedure of a hardness measurement takes place as follows: While the bellows 21 and the folded membrane 22 are under pressure, and thereby the objective is in position for observation, the to-be examined sample is studied microscopically and the place to be tested for hardness is brought into the optical axis AA' of the microscope. Ensuing, the impression is produced thereby, that the compressed air is gradually released from the pneumatic drive. First the bellows 21 collapses so that the horizontal slide 7 moves under the force of the spring 23 so long towards the left until the stops 11 and 13 come into contact with one another. With that the axis B—B' of the diamond has arrived at the place in which before the optical axis A—A' of the objective was located. With further release of the compressed air also the folded membrane 25 collapses and releases the prestress of the cup springs 3 and 4. The inner tube 2 now lifts itself with its feets 2' from the track of the cone wheel 18, the diamond 6 comes into contact with the test object at the previously selected spot and finally is pressed into the test sample with the test load adjusted on the cup springs. Now after the impression has been produced, the procedure is repeated in reverse direction for evaluating the impression. Compressed air is again admitted to the pneumatic drive. First the folded membrane 25 inflates, the diamond is pulled back and the stops 2' come into contact with the track. Therewith the cup springs are again prestressed for the next impression. Ensuing the bellows 21 moves the horizontal slide 7 towards the right until stops 12 and 14 touch. Therewith the observation position of the hardness tester is reestablished so that the impression now visible in the measuring microscope can be evaluated in known manner.

The pneumatic drive of the load movement offers two advantages in contrast with the earlier used arrangements for spring loaded micro hardness testers. On the one hand the microscope adjustments with their unavoidable defects are no longer required for movements of the load. On the other hand the penetrating body moves freely in its spring suspension only over the very short stretch by which the diamond point is removed from the surface of the test object in the observation position. For both reasons a very high certainty of aim can be achieved with this arrangement.

A presupposition for the described manner of pneumatic or hydraulic drive is that the chronological sequence of the two movements proceeds correctly with all test loads. If namely horizontal movements would take place while the vertical movement had not yet reached the final lower position, then the insufficiently pulled back diamond would draw furrows in the test object. In the present embodiment the spring 23 is used for the adjustment of the correct chronological sequence of horizontal and vertical movements. Since the folded membrane 25 has the function of producing and releasing the test load as prestressing of the cup springs, its pressure requirement is dependent on the selected test load. On the other hand the accordion-like bellows 21 must first respond only at pressures which lie distinctly above the working pressure of the folded membrane 25 in order to achieve a chronological separation of the two movements. Consequently also the pressure requirement for bellows 21 must be made dependent on the test load. For this purpose the drum 15 is seated in a flange 28 by means of a thread. In changing the test load, hence in operating the drum 15, the prestress of the spring 23 is changed and receives the required dependence on the test load. Then the horizontal movement with correct spring adjustment can only begin, independent of the test load, when the vertical movement is in its lower final position.

The depicted micro hardness tester is equipped in known manner with an optical load indicator. For this purpose there is located in the path of rays a plate 29 with a semipermeable reflecting layer, and in the path of rays deflected thereat an accessory objective 30 and a load scale 31. The mode of action of this arrangement is such that the play of forces in the cup springs is reflected into the microscope as a vertical displacement of the accessory objective against the scale 31 and is made visible on the image of the scale 31 in the ocular. With the selected arrangement of the hardness tester, the distance between the diamond axis B—B' and the axis of the principal objective A—A' is only of the order of magnitude of the pupillary diameter of the objective. In accordance with a further aspect of the invention, special means are provided, in order to obtain in the two working positions of the micro hardness tester in each case only one image, namely either the image of the test object or that of the load scale and to exclude the other. The micro hardness tester is inserted in known manner into a metallurgical microscope in place of an objective. Then the vertical illuminator produces in the microscope axis A—A' a small image of the suitably half closed aperture diaphragm of the illuminating apparatus, which lies about in the pupillary plane of the hardness tester objective. In the observing position represented in Fig. 1 only the central part of the pupil of the principal objective 1 is illuminated in this manner. The rays of the same illuminating pencil which are deflected at the beam splitting mirror 29 on the other hand do not arrive in the accessory objective 30, but are blocked out at A'' in the blackened tube. In the load position the diamond axis B—B' moves towards the left into the axis A—A' of the microscope. Then the illuminating beam B—B' falls so on the beam splitting mirror 29, that it through the accessory objective 30 illuminates the scale 31 at B''. The same beam B—B', which passes through the beam splitting mirror 29, however also reaches the peripheral portion of the principal objective 1, and in the load position of the hardness tester would supplementarily form a disturbing image of the sample. To eliminate this double image a reciprocating shutter 32 is provided which automatically switches itself into the objective beam in the load position of the hardness tester. While namely in the transition to the load position the horizontal slide 7 and the parts of the hardness tester mounted therein move towards the left, a tappet 33 under the force of a spring 34 remains on the wall of the housing designated by 35. Thereby a lever 37 seated in a pedestal 36 turns and pushes the reciprocating shutter 32 into the beam of the principal objective.

I claim:

1. A micro hardness tester, adapted to be disposed at the tube end of a microscope for metal structure examination, contained in a housing, a tubular body having at its front end, directed toward the substance to be tested for hardness, a microscope objective and laterally spaced therefrom an indenter of a material sufficiently hard for producing an indentation in said substance, a slide body in said housing supporting said tubular body, the latter being mounted slidable in said slide body in the direction of said microscope objective optical axis, said slide body mounted in said housing slidable in a transverse direction at right angles to said axis, means for shifting said slide body together with said tubular body in said transverse direction for an amount equal to the lateral spacing between said optical axis and the mechanical axis of said indenter, means for producing a variable and exactly adjustable test load acting upon said tubular body for driving said body in the direction of said optical axis towards said test substance until said indenter produces an indentation of a depth corresponding to the adjusted test load and to the specific hardness of said substance, means for withdrawing said tubular body and indenter from said test substance against the action of said test load producing means, and means for withdrawing said slide body with said tubular body against the action of said transverse shifting means, both said withdrawing means comprising each an elastic hollow body with their hollow spaces interconnected and further comprising a pressure agent and a pressure controlling means therefor, the one said elastic hollow body being supported between said slide body and said housing and the other said elastic hollow body being supported between said tubular body and said slide body, said test load producing means exercising stronger force than said transverse slide body shifting means so that, upon reducing pressure in said elastic hollow bodies, the transverse shifting motion is finished before the test load driving motion begins and, upon raising pressure, the withdrawing motion of said tubular body is finished before the transverse withdrawing motion of said slide body begins.

2. In a micro hardness tester according to claim 1, means for optically indicating the index of strength of the test load exercised and means for reading said index in the microscope objective field of view, said means at least comprising a scale fixed to said slide body, a lens fixed in an opening in the side of said tubular body facing said scale and a semi-transparent plate located in said tubular body at an angle of 45° to the axis of said tube adjacent said lens, a shutter mounted for movement in a transverse direction to the axis of said tubular body and means for displacing said shutter dependent on the position of said tubular body, so that said shutter blocks the optical axis between the semi-transparent plate and said microscope objective and the scale only is observable when the indenter is shifted into the test load position.

References Cited in the file of this patent

UNITED STATES PATENTS

| | | |
|---|---|---|
| 2,188,992 | Wolpert et al. | Feb. 6, 1940 |
| 2,243,235 | Weingraber | May 27, 1941 |

FOREIGN PATENTS

| | | |
|---|---|---|
| 893,415 | France | Jan. 31, 1944 |
| 895,581 | France | Apr. 3, 1944 |